Figure 1:
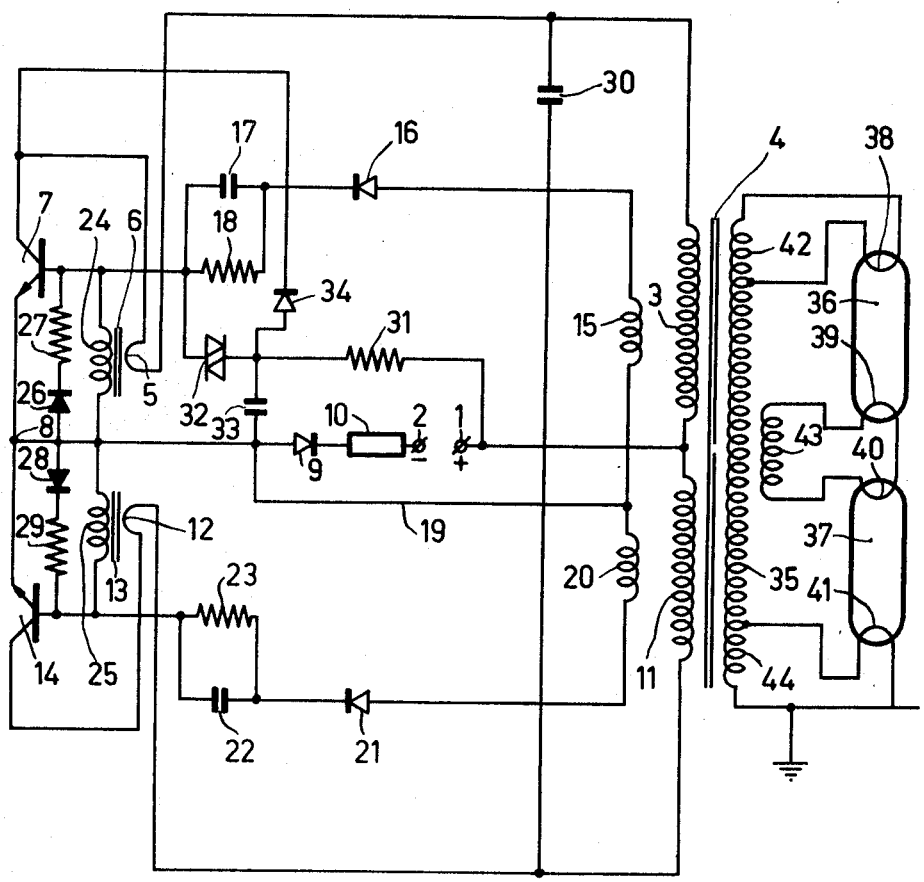

United States Patent
Wijsboom

[15] 3,662,249
[45] May 9, 1972

[54] DC-AC CONVERTER

[72] Inventor: Dan Bernardus Wijsboom, Emmasingel, Eindhoven, Netherlands

[73] Assignee: U.S. Philips Corporation, New York, N.Y.

[22] Filed: Aug. 31, 1970

[21] Appl. No.: 68,401

[30] Foreign Application Priority Data

Sept. 18, 1969 Netherlands............................6914125

[52] U.S. Cl..............................321/11, 321/45 R, 331/113 A
[51] Int. Cl. .......................................................H02m 1/18
[58] Field of Search.........................321/45, 455; 331/113.1

[56] References Cited

UNITED STATES PATENTS

| | | | |
|---|---|---|---|
| 3,134,948 | 5/1964 | Wilting | 331/113.1 |
| 3,350,661 | 10/1967 | Bloom et al. | 321/45 R |
| 3,081,437 | 3/1963 | Radcliffe, Jr. | 321/451 UX |
| 3,256,495 | 6/1966 | Hunter | 331/113.1 |
| 3,020,491 | 2/1962 | Kurtz | 321/45 S |
| 3,051,914 | 8/1962 | Brown | 331/113.1 |

Primary Examiner—William H. Beha, Jr.
Attorney—Frank R. Trifari

[57] ABSTRACT

The invention relates to a DC-AC converter using a transistor whose base-emitter circuit is shunted by a transformer winding. According to the invention, a total current of comparatively high value is generated in this winding due to induction and conduction so that this current removes charge carriers from the base of the transistor when this transistor becomes non-conducting. As a result this transistor is quickly ready again for blocking a voltage across its main electrodes. The invention is especially important in the use of highly resistive transistors for a high voltage.

9 Claims, 2 Drawing Figures

INVENTOR.
DAN B. WIJSBOOM

3,662,249

DC-AC CONVERTER

This invention relates to a DC-AC converter provided with a transistor and a transformer in which a winding of said transformer connects the base and the emitter of said transistor together and in which a circuit generating control signals is coupled to said transformer winding.

A known DC-AC converter of the kind mentioned above is described, for example, in U.S. Pat. No. 3,084,283. An advantage of the circuit described in this U.S. patent is that after a transistor has become non-conducting, the remaining charge carriers in the base of this transistor are removed by means of a voltage induced in the transformer winding so that this transistor is soon ready again to cut off a voltage across its main electrodes. A drawback of the known circuit is, however, that a second transistor in the circuit is rendered conducting substantially simultaneously with the cut-off of the first transistor in the circuit. This might give rise to serious damage to the converter if the transistors are allowed to conduct simultaneously for a short time period.

It is an object of the present invention to provide a DC-AC converter in which the charge carriers are rapidly removed from the base region after a transistor has been turned "off" and in which a second transistor cannot conduct simultaneously with the first transistor.

According to the invention a DC-AC converter is provided with a transistor and a transformer in which a winding of said transformer connects the base and the emitter of said transistor together and in which a circuit generating control signals is coupled to said transformer winding. A feature of the invention is that the two ends of said transformer winding are in electrically conducting connection with the circuit generating the control signals and that the input terminals of the converter are connected by means of a series arrangement which includes at least a different winding of the transformer and the main electrodes of the transistor. The winding sense of the last mentioned transformer winding is chosen so that a current is induced in the first-mentioned transformer winding during the conducting period of the transistor. The latter current flows in the same direction as a current which is generated by the circuit generating control signals in the first-mentioned transformer winding so that the said currents together remove charge carriers from the base of the transistor through the first-mentioned transformer winding when the transistor is cut-off.

The invention is based on the recognition of the fact that a current of comparatively great intensity is generated during the conducting period of the transistor in an inductor which is arranged between the base and the emitter of said transistor, which current is maintained when the transistor becomes non-conducting and thereby removes charge carriers from the base of the transistor. According to the invention this large current consists of two components, namely one component which is obtained from the circuit generating control signals and a second component which is generated through a further transformer winding which is present in the main circuit, that is to say, in the circuit including the main electrodes of the transistor. These two components combined produce a comparatively large current in the said inductor between the base and the emitter of the transistor.

A DC-AC converter according to the invention may be equipped with, for example, low-voltage transistors.

A DC-AC converter according to the invention is preferably equipped with a high-voltage transistor while the operating frequency of the converter is more than 18,000 Hz. In this connection a high-voltage transistor is understood to mean a transistor having a cut-off voltage of at least 300 volts. Such a transistor is made, for example, of highly resistive silicon.

An advantage of this preferred embodiment is that transistors may be used which can withstand a comparatively large voltage but at the same time do not require a fairly low frequency so as to avoid switching losses. On the contrary, due to the rapid removal of the charge carriers by the dual current, this preferred embodiment makes it possible to obtain a converter which is suitable for both a high direct voltage and which may operate at a high frequency.

Figure 2:
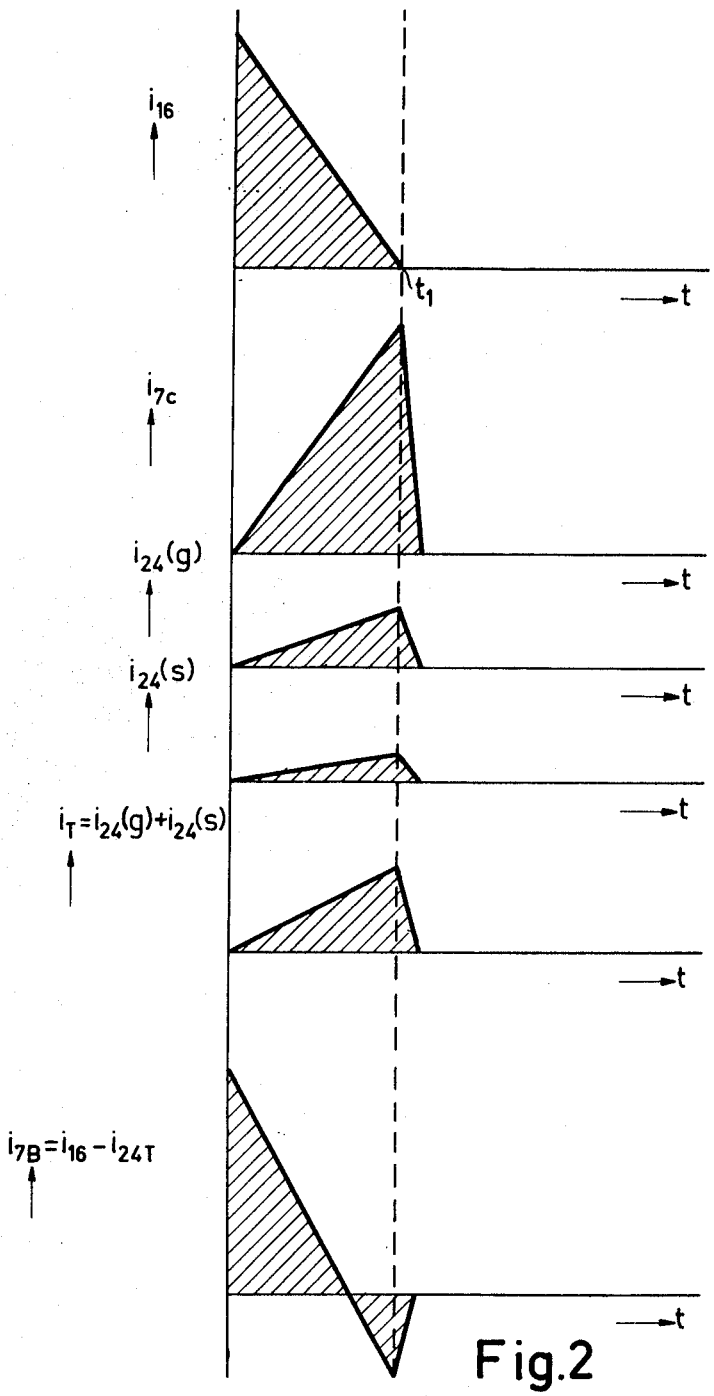

In order that the invention may be readily understood and carried into effect, a few embodiments thereof will now be described in detail by way of example with reference to the accompanying diagrammatic drawings, in which:

FIG. 1 shows an electric circuit of an arrangement according to the invention, and FIG. 2 shows a few graphs illustrating diagrammatically the current as a function of time in different parts of the circuit arrangement of FIG. 1.

In FIG. 1 the reference numerals 1 and 2 denote connecting terminals which are intended to be connected to a direct voltage source. The reference numeral 1 denotes the positive terminal and the reference numeral 2 denotes the negative terminal. The terminals 1 and 2 are connected together through two series arrangements. One series arrangement includes a winding 3 of a transformer 4, a winding 5 of a transformer 6, the main electrodes of a transistor 7, a tapping 8, a diode 9 and a fuse 10. The diode 9 provides a safeguard against a wrong connection of the connecting terminals 1 and 2 to the direct current source. The other series arrangement includes a winding 11 of the transformer 4, a winding 12 of a transformer 13, the main electrodes of a transistor 14, the tapping 8, the diode 9 and the fuse 10. These two series arrangements constitute the main current series arrangements of the converter. In addition the circuit arrangement includes a circuit for generating control signals. This circuit includes a winding 15 of the transformer 4, a diode 16, and a capacitor 17 which is shunted by a resistor 18. A connecting wire 19, which connects the winding 15 to a connection between the tapping 8 and the diode 9, is likewise associated with the circuit generating control signals. A further section of the circuit generating control signals is substantially equal to the first section of this circuit and includes a winding 20 of the transformer 4, a diode 21 and a capacitor 22 which is shunted by a resistor 23. The wire 19 is common for the two sections of the circuit generating control signals.

Furthermore, the circuit arrangement includes a winding 24 of the transformer 6. This winding 24 connects the base and the emitter of the transistor 7 together. Furthermore, the ends of this winding 24 are electrically connected to the circuit generating control signals (15 to 23 inclusive).

Similarly the base and the emitter of the transistor 14 are connected together by a secondary winding 25 of the transformer 13. Also the ends of this winding 25 are in electrically conducting connection with the further section of the circuit generating control signals.

The circuit diagram further shows that the base-emitter circuit of the transistor 7 is shunted by a series arrangement of a diode 26 and a resistor 27 and that the base-emitter circuit of the transistor 14 is shunted by a series arrangement of a diode 28 and a resistor 29. Furthermore, a capacitor 30 is present which connects the two extreme ends of the windings 3 and 11 of the transformer 4 together. Furthermore, an auxiliary circuit for starting the converter is present. This auxiliary circuit includes a resistor 31 which is connected to the input terminal 1 and a diac 32 which is connected in series with the resistor 31. The other end of this diac 32 is connected to the connection between the resistor 18 and the winding 24. Furthermore, a connection between the resistor 31 and the diode 9 is present. This connection includes a capacitor 33. A diode 34 is connected to the junction between the resistor 31 and the diac 32. The other end of this diode 34 is connected to the collector of the transistor 7.

Transformer 4 has a secondary winding which is denoted by the reference numeral 35. Two series-arranged low-pressure mercury vapor discharge lamps 36 and 37 are connected to this winding 35. The lamp 36 is provided with two preheated electrodes 38 and 39. The lamp 37 is provided with two preheated electrodes 40 and 41. The preheated electrode 38 is fed from a section 42 of the winding 35. The series-arranged windings 39 and 40 are connected to an additional winding 43 of the transformer 4. The preheated electrode 41 of the lamp 37 is connected in a manner corresponding to the electrode 38, namely to a section 44 of the winding 35.

The circuit arrangement described operates as follows. When the terminals 1 and 2 are connected to a direct voltage source, a current will first flow from terminal 1 via the resistor 31 to the capacitor 33 and via the diode 9 back to the terminal 2. When this capacitor 33 is sufficiently charged, the diac 32 will break down and thereby render the base of the transistor 7 positive relative to its emitter so that this transistor 7 begins to conduct. Subsequently a current will start to flow through the first main series arrangement, to wit from terminal 1 through winding 3, winding 5, the main electrodes of transistor 7, tapping 8, diode 9, and fuse 10 to terminal 2. This current will induce a voltage in the winding 11 in such a manner that the side of the winding 11 remote from the winding 3 receives a voltage which is positive relative to the junction of the windings 3 and 11. As a result of the joint voltages across the windings 3 and 11 the capacitor 30 will now be charged.

However, due to conduction in the transistor 7, the capacitor 33 will be discharged, namely through the diode 34 and the main electrode circuit of the transistor 7. As a result this transistor will be cut-off again, because no base current is available anymore to maintain this transistor conducting. As a result the capacitor 30 will be discharged across the windings 11 and 3. This discharge induces, inter alia, a voltage in the windings 20 and 15. These windings are wound in such a manner that the end of the winding 20 which is remote from the winding 15 now receives a positive voltage relative to the junction of the windings 20 and 15. As a result a current will start to flow through the diode 21 and the capacitor 22. This current is then split up into a portion which flows through the base-emitter junction of the transistor 14 and a portion which flows through the winding 25 of the transformer 13. These two currents then flow jointly through the return line 19 to the winding 20. The portion of the current flowing through the base of the transistor 14 renders this transistor conducting. In a corresponding manner to that described with reference to the first main series arrangement, a main current will start to flow from terminal 1 through winding 11, through winding 12, the main electrodes of the transistor 14, the tapping 8, the diode 9, and the fuse 10 to the terminal 2 when the transistor 14 conducts. When the capacitor 22 is charged as a result of the current flowing through the diode 21, no further current will flow through this circuit and hence the transistor 14 will become non-conducting. Due to the current which initially flowed through the winding 25, and due to an additional current in the winding 25 induced therein by winding 12 and flowing in the same direction as the initial current, a total current now flows through said inductor 25, which current removes charge carriers from the base of the transistor 14 when the transistor 14 becomes non-conducting. The advantage thereof is that this transistor is then quickly brought to a state where it is again ready to block a voltage across its main electrodes. During the conducting state of transistor 14, the capacitor 30 was charged in a reversed sense. Since the transistor 14 has become non-conducting again, the capacitor 30 is discharged again, but now across the windings 3 and 11 which leads causes to a voltage to be induced in the winding 15 of the transformer 4. The voltage across the winding 15 produces, through the diode 16, the capacitor 17, etc., a conducting state in the transistor 7. Subsequently the described procedure is repeated, provided that components of current are now generated in the winding 24 of the transformer 6. This dual current leads to the fast removal of charge carriers from the base of the transistor 7 when this transistor 7 is once again cut-off.

The currents flowing in the windings 3 and 11 are magnetically transferred to the windings 35, 42, 43 and 44 on the load side of the converter. The two lamps 36 and 37 are then energized. Since the transformer 4 is formed as a leakage transformer, the discharge of these lamps is stabilized by means of this transformer.

FIG. 2 shows a few current vs. time graphs. These graphs illustrate a somewhat diagrammatical view of the current variation.

The current ($i_{16}$) flowing through the diode 16 is plotted as a function of time $t$ on the first line of FIG. 2.

The collector currents ($i_{7c}$) of the transistor 7 is plotted as a function of time on the second line of FIG. 2.

The current $i_{24}(g)$ which is induced in the winding 24 by the current flowing through the winding 5 is plotted on the third line of FIG. 2.

The current $i_{24}(S)$ in the winding 24 which is generated therein up to an instant $t_1$ by the circuit generating control signals is plotted on the fourth line of FIG. 2. The reference $t_1$ represents the instant at which the transistor 7 becomes non-conducting. After this instant $t_1$ a decreasing current will flow through the winding 24 as a result of the inductive character of this winding in combination with the presence of residual charge carriers in the base of transistor 7.

The total current $iT$ flowing through the winding 24 is plotted as a function of time on the fifth line of FIG. 2 (thus the combination of the two previous lines).

The base current $i_{7B}$ of the transistor 7 is plotted as a function of time on the last line of FIG. 2.

The first line of FIG. 2 shows that the current flowing through the diode 16 has a decreasing variation. The collector current of the transistor 7 has an increasing variation up to the instant $t_1$ due to the influence of, for example, the winding 3. The penultimate line of FIG. 2 shows that a comparatively large current flows in the winding 24 at the instant $t_1$. The base current of the transistor 7, as shown on the last line of FIG. 2, consists of the current flowing through the diode 16 minus the total current flowing through the inductor 24. It is evident that this base current, as is shown in FIG. 2, is greatly negative at the instant $t_1$. The downward peak on this last line of FIG. 2 shows the removal of the charge carriers from the base of the transistor 7. It is evident that corresponding graphs may be given for the transistor 14 and the inductor 25.

The diode 26 and 28 (see FIG. 1) serve as a safeguard in combination with the resistors 27 and 29, respectively.

In one embodiment the battery voltage was 100 volts and the transistors were high-voltage silicon transistors. The inductance of each of the windings 24 and 25 was approximately 100 $\mu$H. In that case each of the lamps 36 and 37 were low-pressure mercury vapor discharge lamps of 20 watts having an operating voltage of approximately 50 volts. The operating frequency of the converter was approximately 20,000 Hz.

What is claimed is:

1. A DC-AC converter comprising a pair of input terminals adapted for connection to a source of voltage, a transistor, a transformer having a winding which connects the base and the emitter of said transistor together, a circuit for generating control signals coupled to said transistor base electrode, means coupling the two ends of said transformer winding in electrically conducting connection with the circuit for generating control signals to generate a first current component in said winding, means connecting a series arrangement which includes a second winding of the transformer and the main electrodes of the transistor across the input terminals of the converter, the winding sense of the second transformer winding being arranged in a manner such that a second current component is induced in the first-mentioned transformer winding during the conducting period of the transistor, which second current component flows in the same direction as said first current component in the first-mentioned transformer winding so that the said first and second currents together remove charge carriers from the transistor base through the first-mentioned transformer winding when the transistor becomes non-conducting.

2. A DC-AC converter as claimed in claim 1 in which the transistor is a high-voltage transistor, characterized in that the operating frequency of the converter is more than 18,000 Hz.

3. A DC-AC converter comprising a pair of input terminals adapted for connection to a source of voltage, a transistor having base, emitter and collector electrodes, a transformer having first and second windings, means connecting said first winding between the base and emitter electrodes of said transistor, a circuit for generating control signals coupled to said base electrode to cause said transistor to repetitively turn on and off, means electrically connecting said first winding to said signal generating circuit to cause a first current component to flow in said winding, means connecting said second winding in series with the transistor emitter-collector electrodes across said input terminals thereby to induce a second current component in the first winding due to current flow in the second winding during the transistor conduction period, said first and second windings being relatively wound so that said second current component flows in the same direction as said first current component in said first winding whereby said first and second currents are combined to rapidly sweep charge carriers from the transistor base region via the first winding when the transistor is cut-off.

4. A converter as claimed in claim 3 wherein said circuit for generating control signals comprises a second transformer with a first winding connected in series with the emitter-collector electrodes of said transistor and the second winding of the first transformer across the converter input terminals and a second winding coupled across the base-emitter circuit of the transistor to derive said first current component in said first winding of the first transformer.

5. A converter as claimed in claim 4 wherein said circuit for generating control signals further comprises a unidirectional current element connected in series with the second winding of said second transformer and with the same polarity as the base-emitter junction of the transistor.

6. A converter as claimed in claim 4 further comprising a capacitor coupled to the first winding of said second transformer to form therewith a self-oscillating resonant circuit.

7. A converter as claimed in claim 3 further comprising an auxiliary starting circuit that includes a resistor and capacitor coupled to said input terminals and a voltage breakdown element coupled between the base of the transistor and the junction point of said resistor and capacitor.

8. A converter as claimed in claim 7 further comprising a diode connected between said junction point and the collector electrode of the transistor and poled so as to discharge the capacitor through said transistor when the transistor is triggered into conduction.

9. A converter as claimed in claim 3 further comprising a second transistor connected in a push-pull circuit arrangement with the first transistor across said input terminals, a second transformer having a third winding connected between the base and emitter of the second transistor and a fourth winding connected in series with the second transistor emitter-collector electrodes across said input terminals, a second circuit for generating control signals coupled to said second transistor base electrode to cause the second transistor to repetitively turn off when said first transistor turns on and vice versa, means electrically connecting said third winding to said second signal generating circuit to cause a first current component to flow in said third winding, said third and fourth windings being relatively wound so that a second current component is induced in the third winding by the current flow in the fourth winding during the conduction period of the second transistor and in the same direction as said first current component whereby said first and second currents are combined to rapidly sweep charge carriers from the second transistor base region via the third winding when the second transistor is cut-off.

* * * * *